(12) United States Patent
Sato

(10) Patent No.: US 11,731,338 B2
(45) Date of Patent: Aug. 22, 2023

(54) MOLDING MOLD AND MANUFACTURING METHOD THEREOF

(71) Applicant: KTX CORPORATION, Konan (JP)

(72) Inventor: Katsuya Sato, Konan (JP)

(73) Assignee: KTX CORPORATION, Konan (JP)

( * ) Notice: Subject to any disclaimer, the term of this patent is extended or adjusted under 35 U.S.C. 154(b) by 0 days.

(21) Appl. No.: 17/835,349

(22) Filed: Jun. 8, 2022

(65) Prior Publication Data
US 2023/0059100 A1 Feb. 23, 2023

(30) Foreign Application Priority Data
Aug. 20, 2021 (JP) .................. 2021-135221

(51) Int. Cl.
*B29C 51/36* (2006.01)
*B29C 51/40* (2006.01)
*B29C 33/38* (2006.01)

(52) U.S. Cl.
CPC .......... *B29C 51/40* (2013.01); *B29C 33/3842* (2013.01); *B29C 51/36* (2013.01)

(58) Field of Classification Search
CPC ......... B29C 51/36; B29C 51/40; B29C 33/10; B29C 33/18; B29C 51/365; B29C 2045/14155; B29C 51/105; B29C 2049/6272; B29C 2043/3605; B25B 11/005
See application file for complete search history.

(56) References Cited

U.S. PATENT DOCUMENTS

| 3,307,817 | A | * | 3/1967 | Cocito | .................. | G03B 27/60 |
| | | | | | | 248/362 |
| 3,396,430 | A | * | 8/1968 | Westcott | .............. | B65D 81/262 |
| | | | | | | 425/398 |
| 3,474,497 | A | * | 10/1969 | Ridley, Jr. | ............... | B29C 51/36 |
| | | | | | | 425/149 |
| 6,101,846 | A | * | 8/2000 | Elledge | .................. | H01J 9/185 |
| | | | | | | 65/44 |
| 6,299,740 | B1 | * | 10/2001 | Hieronymi | .......... | H01J 37/3423 |
| | | | | | | 204/192.12 |
| 2015/0047975 | A1 | * | 2/2015 | West | .................. | H01J 37/3405 |
| | | | | | | 204/298.12 |

FOREIGN PATENT DOCUMENTS

| JP | S61-14922 A | 1/1986 |
| JP | 2021-53920 A | 4/2021 |

* cited by examiner

*Primary Examiner* — Matthew J Daniels
(74) *Attorney, Agent, or Firm* — Posz Law Group, PLC

(57) ABSTRACT

A molding mold includes a shell mold provided with a plurality of vacuum suction holes and a backup mold for backing up the shell mold, a back surface of the shell mold and a front surface of the backup mold having the same shape and being fitted to each other. A ventilation groove is formed on the front surface of the backup mold or the back surface of the shell mold, leaving a receiving surface for receiving a mating surface, a plurality of striped grooves and ridges between the striped grooves are formed on the back surface of the shell mold or the front surface of the backup mold, the striped grooves having a feed pitch of 0.5 mm to 5.0 mm and a processing depth of 0.01 mm to 0.4 mm, and the vacuum suction holes and the ventilation groove communicate with each other through the striped grooves.

10 Claims, 9 Drawing Sheets

ROUGH PROCESSING

INTERMEDIATE FINISHING PROCESSING

FINISHING PROCESSING

FIG. 7A  COMPARATIVE EXAMPLE
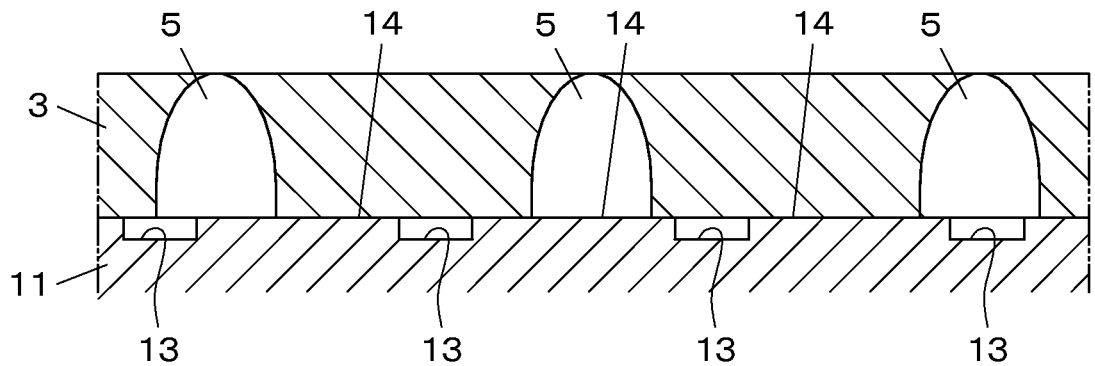
FIG. 7B  EMBODIMENT
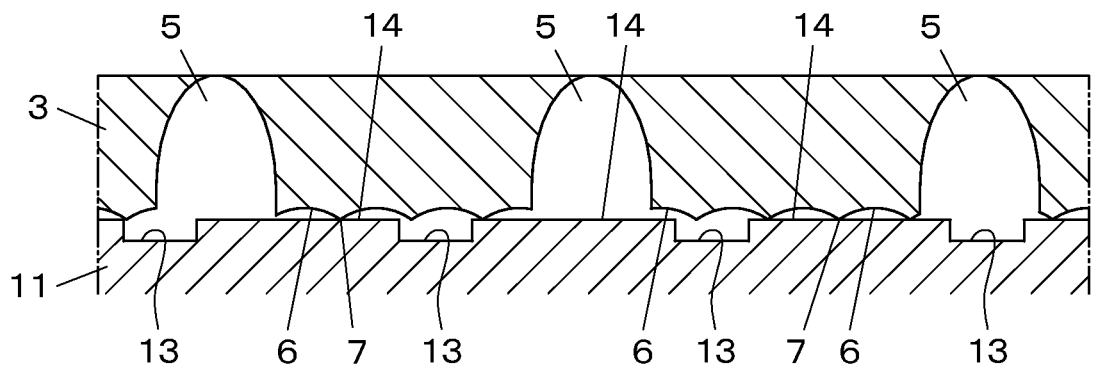
FIG. 7C  EMBODIMENT (ANOTHER SECTION)
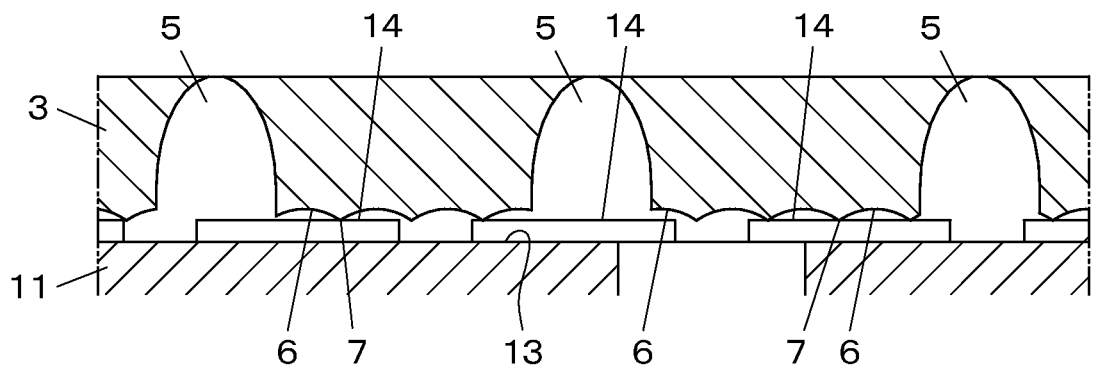

F I G. 8
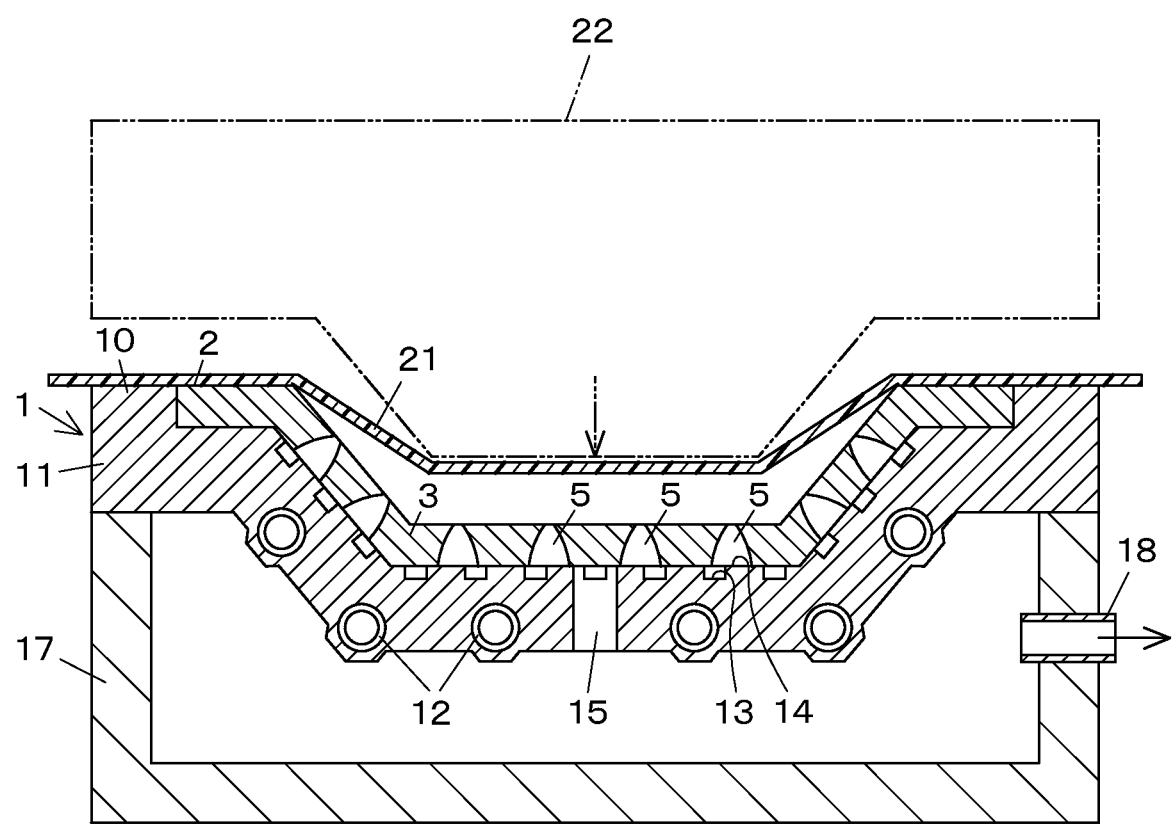

MOLDING MOLD AND MANUFACTURING METHOD THEREOF

TECHNICAL FIELD

The present invention relates to a molding mold having a vacuum suction function.

BACKGROUND ART

Many molding molds having a function of vacuum-sucking a sheet onto a mold surface include a relatively thin shell mold provided with a plurality of vacuum suction holes and a backup mold that backs up the shell mold. This is because it is easy to form a plurality of vacuum suction holes in a relatively thin shell mold. On the other hand, the backup mold needs to be devised to provide a ventilation path that communicates with the vacuum suction holes while the backup mold supports the shell mold.

The backup mold described in Patent Document 1 is provided with a storage recess that is slightly larger than the back surface of the shell mold and a plurality of support protrusions protruding from the storage recess, and the support protrusions support the back surface of the shell mold. The storage recess serving as a ventilation path communicates with vacuum suction holes of the shell mold, and the storage recess is depressurized from outside the mold. However, with this backup mold, when the pressure at the time of molding is high, the support protrusions cannot sufficiently support the shell mold, and thus the shell mold may be deformed.

The front surface of the backup mold described in Patent Document 2 has a shape that matches the back surface of the shell mold, and a ventilation groove is recessed, leaving a plurality of receiving surfaces on the front surface, and the receiving surfaces support the back surface of the shell mold. The ventilation groove serving as a ventilation path communicates with the vacuum suction holes of the shell mold, and the ventilation groove is depressurized from outside the mold through ventilation holes. This backup mold can sufficiently support the shell mold even when the pressure during molding is high and suppress the shell mold from being deformed. However, with this backup mold, not all the vacuum suction holes communicate with the ventilation groove, and the receiving surfaces may sometimes fully close some vacuum suction holes, which may deteriorate the overall vacuum suction efficiency.

CITATION LIST

Patent Documents

Patent Document 1: Japanese Unexamined Patent Application Publication No. 61-14922 (JP 61-14922 A)
Patent Document 2: Japanese Unexamined Patent Application Publication No. 2021-53920 (JP 2021-53920 A)

SUMMARY OF INVENTION

Technical Problem

Therefore, an object of the present invention is to sufficiently back up a shell mold with a backup mold to suppress deformation of the shell mold, and to communicate all vacuum suction holes of the shell mold with a ventilation groove so as to enhance the vacuum suction efficiency.

Solution to Problem

[1] Molding Mold

A molding mold includes a shell mold provided with a plurality of vacuum suction holes and a backup mold for backing up the shell mold, a back surface of the shell mold and a front surface of the backup mold having the same shape and being fitted to each other. In the molding mold, a ventilation groove is formed on the front surface of the backup mold or the back surface of the shell mold, leaving a receiving surface for receiving a mating surface, a plurality of striped grooves (grooves arranged in stripes) and ridges between the striped grooves are formed on the back surface of the shell mold or the front surface of the backup mold (however, on the "receiving surface" in the case of the surface on which the ventilation groove is provided), the striped grooves having a feed pitch of 0.5 mm to 5.0 mm and a processing depth of 0.01 mm to 0.4 mm, and the vacuum suction holes and the ventilation groove communicate with each other through the striped grooves.

<Action>

The back surface of the shell mold and the front surface of the backup mold that have the same shape abut each other via the ridges, whereby the backup mold sufficiently backs up the shell mold and thus deformation of the shell mold can be suppressed.

The vacuum suction holes and the ventilation groove communicate with each other through the striped grooves. Therefore, all of the vacuum suction holes of the shell mold can communicate with the ventilation groove, thereby enhancing vacuum suction efficiency.

The striped grooves have the feed pitch of 0.5 mm to 5.0 mm and the processing depth of 0.01 mm to 0.4 mm. Therefore, both of the vacuum suction efficiency and rigidity of the shell mold can be achieved. When the feed pitch is less than 0.5 mm and the processing depth is less than 0.01 mm, the vacuum suction efficiency deteriorates. When the shell mold is formed with the feed pitch of more than 5.0 mm and the processing depth of more than 0.4 mm, the shell mold is slightly deformed by the pressure during molding, which affects a dimensional accuracy of the molded product and durability of the mold.

[2] Manufacturing Method of Molding Mold

In a manufacturing method of a molding mold including a shell mold provided with a plurality of vacuum suction holes and a backup mold for backing up the shell mold, a back surface of the shell mold and a front surface of the backup mold having the same shape and being fitted to each other, a ventilation groove is processed on the front surface of the backup mold or the back surface of the shell mold, leaving a receiving surface for receiving a mating surface, and the back surface of the shell mold or the front surface of the backup mold (however, on the "receiving surface" in the case of the surface on which the ventilation groove is provided) is applied with cutting with an end mill provided with a non-flat tip to leave a plurality of striped grooves and ridges between the striped grooves as cutting marks, the striped grooves having a feed pitch of 0.5 mm to 5.0 mm and a processing depth of 0.01 mm to 0.4 mm.

<Action>

Cutting the back surface of the shell mold or the front surface of the backup mold in one direction with the end mill provided with a non-flat tip makes it possible to efficiently form the striped grooves and the ridges between the striped grooves as cutting marks, the striped grooves having the feed pitch of 0.5 mm to 5.0 mm and the processing depth of 0.01 mm to 0.4 mm.

Advantageous Effects of Invention

According to the molding mold of the present invention, the shell mold is sufficiently backed up by the backup mold and thus deformation of the shell mold can be suppressed, and all of the vacuum suction holes of the shell mold communicate with the ventilation groove, which enhances the vacuum suction efficiency.

BRIEF DESCRIPTION OF DRAWINGS

FIG. 1A is a perspective view and FIG. 1B is a partially enlarged perspective view;

FIG. 2A is a perspective view and FIG. 2B is a partially enlarged perspective view;

FIG. 3A is a perspective view at the time of rough processing, FIG. 3B is a perspective view at the time of intermediate finishing processing, and FIG. 3C is a perspective view at the time of finishing processing;

FIG. 4A is a perspective view and FIG. 4B is a partially enlarged perspective view;

FIG. 6A is a perspective view and FIG. 6B is a sectional view;

FIG. 7A is an enlarged sectional view of a main portion of a molding mold of a comparative example, FIG. 7B is an enlarged sectional view of a main portion of the molding mold according to the first embodiment, and FIG. 7C is an enlarged sectional view of the main portion of the molding mold according to the first embodiment cut in another direction;

FIG. 8 is a sectional view of a resin sheet at the time of vacuum molding using the molding mold according to the first embodiment.

DESCRIPTION OF EMBODIMENTS

<1> Shell Mold

Figure 1A:
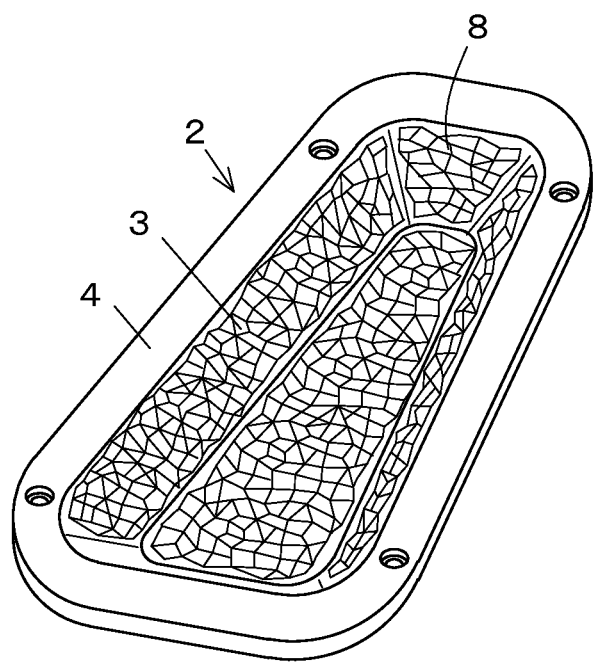
FIGS. 1A and 1B show the front surface side of a shell mold in a molding mold according to a first embodiment.

Examples of a shell mold include those formed by electroforming, casting, cutting, electric discharge machining, and the like. The shell mold formed by electroforming has advantages that, for example, the manufacturing efficiency is high, an uneven pattern can be easily formed by transferring the pattern from a model, and vacuum suction holes can be formed at the time of electroforming, and therefore electroforming is preferable.

The thickness of the shell mold is not particularly limited, but is preferably 2 mm to 6 mm, more preferably 2.5 mm to 5 mm. With the above thickness, it is easy to manufacture the shell mold by electroforming or the like, and it is easy to form the vacuum suction holes.

The material of the shell mold is not particularly limited, and examples thereof include metal (nickel, steel, etc.) and ceramics.

Forming an uneven pattern on the front surface (mold surface) of the shell mold makes it possible to form an uneven pattern by transferring the uneven pattern on the surface of a skin that is vacuum-sucked on the front surface of the shell mold. The uneven pattern is not particularly limited, and examples thereof include a leather grain pattern, a stitch pattern, and a plurality of repeated arrangements of geometric unit patterns.

The shell mold is preferably attached to the backup mold so as to be replaceable. Examples of its attachment structure include screwing by screws and fitting by a fitting shape.

<2> Vacuum Suction Hole

The vacuum suction hole is not particularly limited, and examples thereof include those formed by electroforming using the method described in Japanese Unexamined Patent Application Publication No. 60-152692 (JP 60-152692 A), Japanese Unexamined Patent Application Publication No. 9-249987 (JP 9-249987 A), etc., those formed by machining (drilling, etc.), and those formed by high energy beam processing (laser processing, electron beam processing, ion beam processing, etc.).

The diameter of the vacuum suction hole is not particularly limited, but is preferably 0.1 mm to 0.3 mm on the front surface side of the shell mold and 0.1 mm to 5 mm on the back surface side of the shell mold.

<3> Backup Mold

The backup mold is not particularly limited, and examples thereof include those formed by casting, cutting, electric discharge machining, and the like.

The thickness of the backup mold is not particularly limited, but is preferably 10 mm or more, and more preferably 20 mm or more. With this thickness, the backup mold has high rigidity.

The material of the backup mold is not particularly limited, and examples thereof include metal (aluminum alloy, steel, etc.) and ceramics.

<4> Ventilation Groove

A ventilation groove can be formed on either one or both of the front surface of the backup mold and the back surface of the shell mold. However, it is preferable to form the ventilation groove on only one of the front surface of the backup mold and the back surface of the shell mold in terms of processing efficiency and the like, and it is more preferable to form the ventilation groove only on the front surface of the backup mold in terms of lower possibility of a decrease in the mold strength.

Examples of the ventilation groove include those formed by machining (cutting, etc.), electric discharge machining, etching, etc.

The pattern of the ventilation groove is not particularly limited, and examples thereof include a single line or a plurality of lines, a net shape (a square grid shape, a triangular grid shape, a hexagonal grid shape, etc. as described in Patent Document 2).

It is preferable to include the ventilation groove extending in a direction intersecting the direction of striped grooves. With this configuration, the ventilation groove communicates with a plurality of striped grooves.

The depth of the ventilation groove is not particularly limited, but is preferably 0.2 mm to 3 mm, more preferably 0.2 mm to 2 mm, and most preferably 0.3 mm to 1 mm. When the depth of the ventilation groove is 0.2 mm or more, the air permeability is good, and when the depth is 3 mm or less, the strength of the backup mold is less likely to decrease.

The width of the ventilation groove is not particularly limited, but is preferably 1 mm to 7 mm, more preferably 1 mm to 5 mm. When the width of the ventilation groove is 1 mm or more, the air permeability is good, and when the width is 7 mm or less, the strength of the backup mold is less likely to decrease.

<5> Striped Grooves and Ridges

Striped grooves and ridges can be formed on either one or both of the back surface of the shell mold and the front surface of the backup mold. However, it is preferable to form the striped grooves and the ridges on only one of the back surface of the shell mold and the front surface of the backup mold because a fitting accuracy of the shell mold and the backup mold deteriorates if the striped grooves and the ridges are formed on both of the surfaces, and it is more preferable to form the striped grooves and the ridges only on the back surface of the shell mold in terms of small amount of processing of the shell mold.

The direction of the striped grooves and the ridges may be unidirectional over the entire surface (the back surface of the shell mold or the front surface of the backup mold) on which the striped grooves and the ridges are formed, or may be changed among multiple regions set on the surface on which the striped grooves and the ridges are formed.

The end mill provided with a non-flat tip is not particularly limited, and examples thereof include a ball end mill and a radius end mill.

The blade diameter of the end mill is not particularly limited, but 15 mm to 20 mm can be exemplified.

As described above, the multiple striped grooves have a feed pitch of 0.5 mm to 5.0 mm and a processing depth of 0.01 mm to 0.4 mm, but more preferably a feed pitch of 1.0 mm to 3.0 mm and a processing depth of 0.02 mm to 0.15 mm.

The relationship between the feed pitch and the processing depth is not particularly limited, but the feed pitch is preferably 20 to 50 times the processing depth.

<6> Molding Mold

A molding mold according to the present invention can be embodied as a mold for various kinds of molding (molding is not particularly limited, and examples thereof include vacuum molding, pressure molding, insert injection molding, blow molding, stamping molding, press molding, slash molding, etc.) for molding a polymer material while the vacuum suction function is utilized.

EMBODIMENTS

Hereinafter, examples embodying the present invention will be described with reference to the drawings. The materials, configurations, and numerical values described in the embodiments are examples and can be changed as appropriate.

First Embodiment

A molding mold 1 according to a first embodiment shown in FIGS. 1A and 1B to 8 is a mold for vacuum molding.

The molding mold 1 includes a shell mold 2 provided with a plurality of vacuum suction holes 5 and a backup mold 10 for backing up the shell mold 2. The back surface of the shell mold 2 and the front surface of the backup mold 10 have the same shape and are fitted to each other as shown in FIGS. 6A, 6B, 7B and 7C.

As shown in FIGS. 1A, 1B, 2A, and 2B, the shell mold 2 is formed into a shell shape having a thickness of 2 mm to 6 mm by nickel electroforming, and includes a female mold (recessed shape) shell main body 3 and a flange portion 4 around the shell main body 3.

A large number of vacuum suction holes 5 are formed to be dispersed over the entire shell main body 3 and are not formed in the flange portion 4. The vacuum suction holes 5 are formed during nickel electroforming. The diameter of each vacuum suction hole 5 is 0.1 mm to 0.3 mm on the front surface side of the shell mold 2, increases toward the back surface of the shell mold 2, and is 3 mm to 5 mm on the back surface side of the shell mold 2. The vacuum suction holes may be formed by post-processing (machining, high energy beam processing).

Figure 1B:
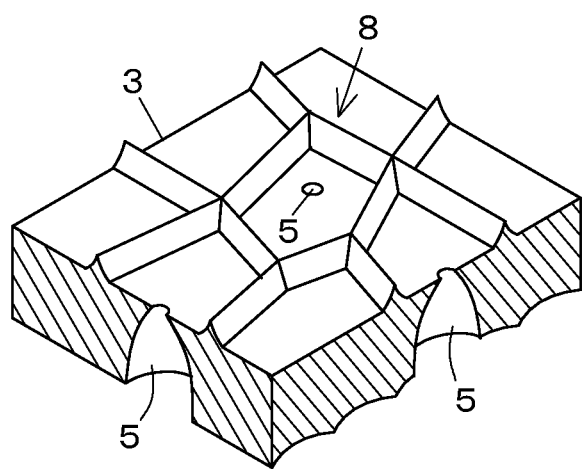

As shown in FIGS. 1A and 1B, an uneven pattern 8 is formed on the front surface (mold surface) of the shell main body 3 at the time of electroforming. The uneven pattern 8 in the illustrated example is a leather grain pattern.

Figure 2A:
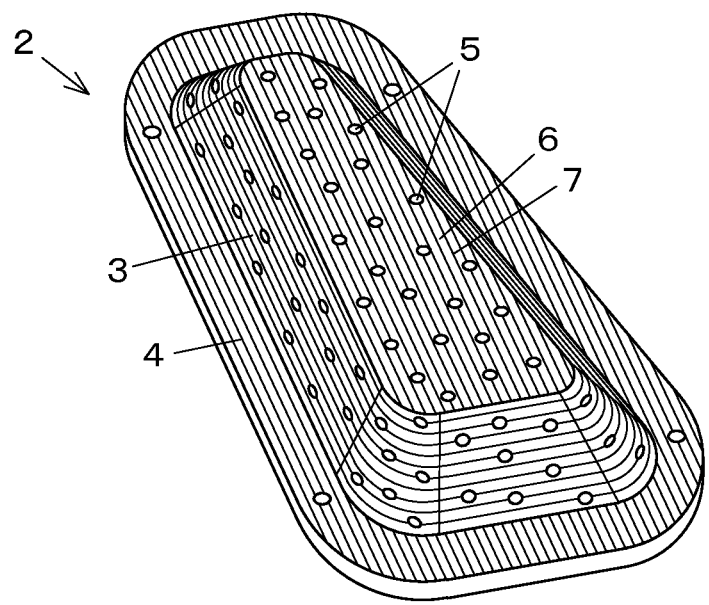
FIGS. 2A and 2B show the back surface side of the same shell mold.
Figure 2B:
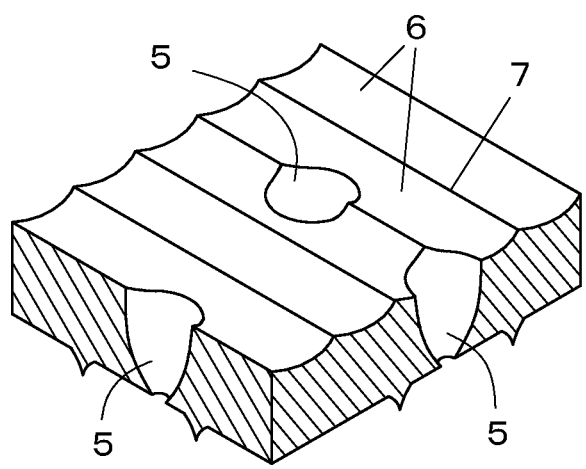
Figure 3A:
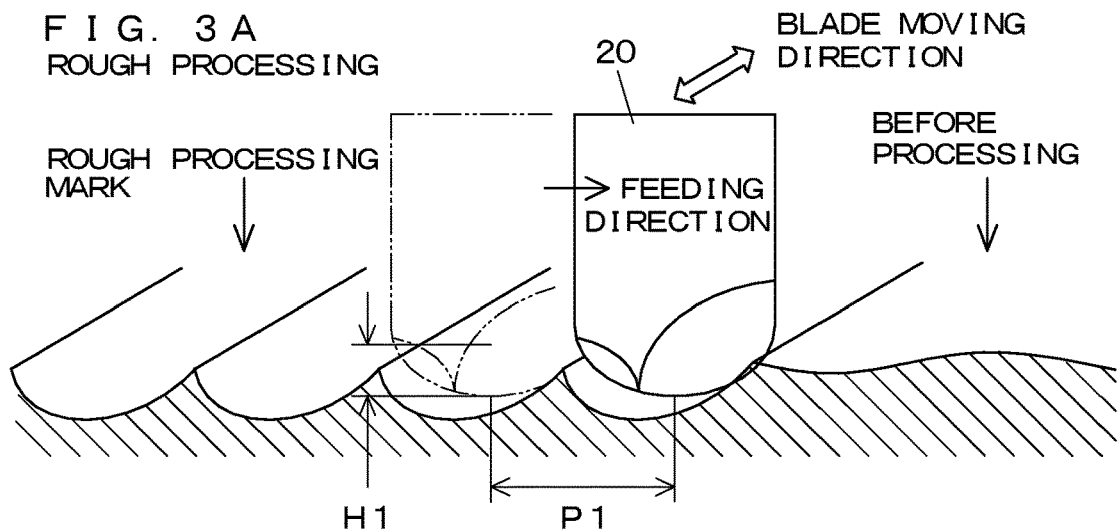
FIGS. 3A, 3B, and 3C show cutting.
Figure 3B:
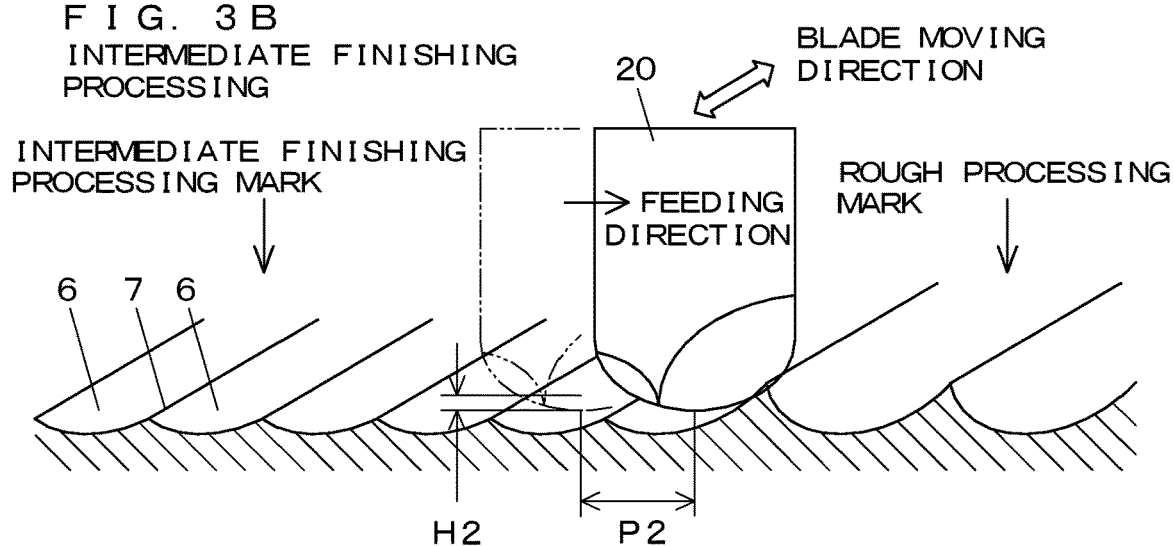

As shown in FIGS. 2A and 2B, a plurality of striped grooves 6 having a feed pitch of 0.5 mm to 5.0 mm and a processing depth of 0.01 mm to 0.4 mm and ridges 7 between the striped grooves 6 are formed on the back surface of the shell mold 2. As shown in FIGS. 3A and 3B, the striped grooves 6 and the ridges 7 are formed as cutting marks by cutting the back surface of the shell mold 2 with an end mill 20 provided with a non-flat tip. The method thereof will be described in detail after the backup mold 10 is described.

Figure 4A:
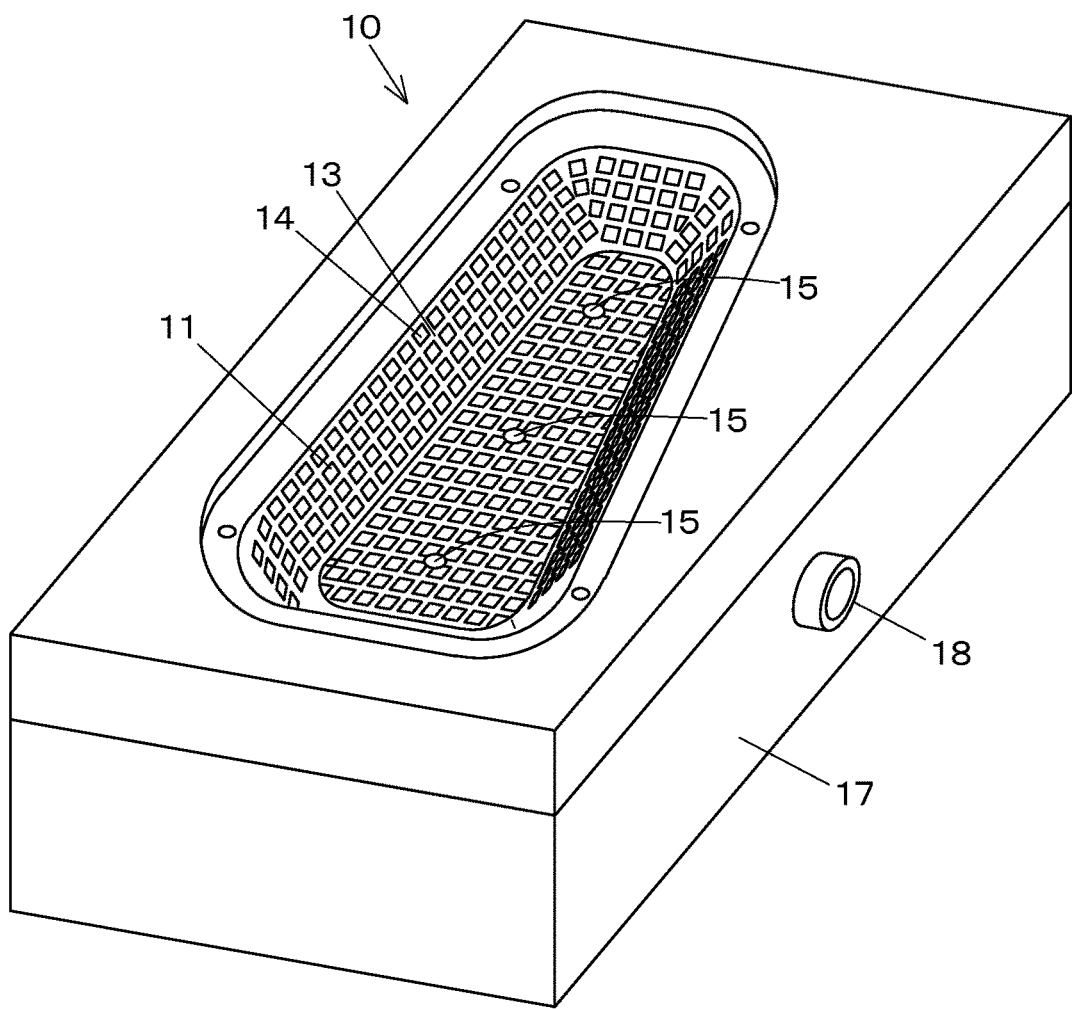
FIGS. 4A and 4B show the front surface side of a backup mold in the molding mold according to the first embodiment.
Figure 4B:
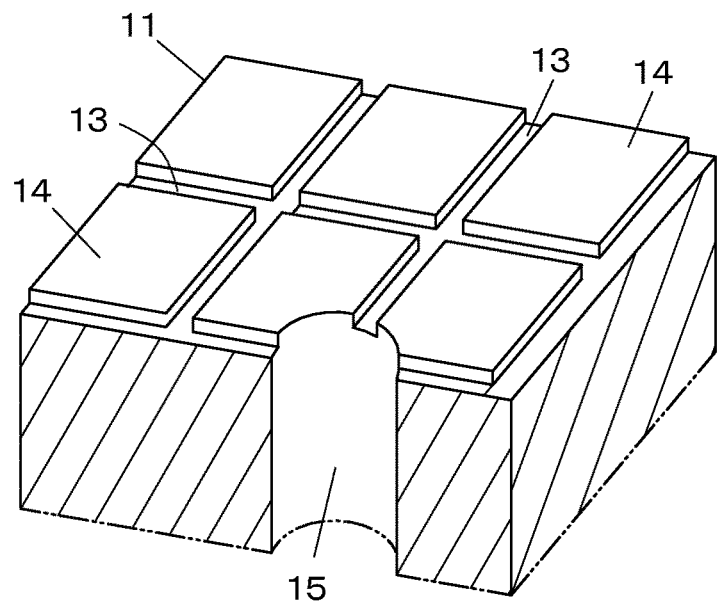
Figure 5:
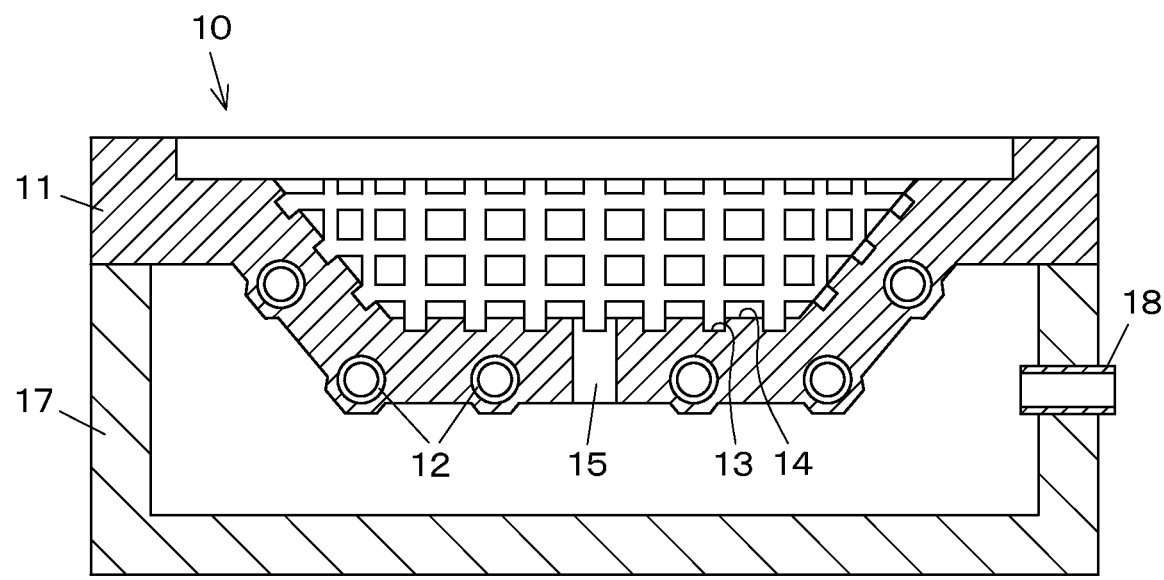
FIG. 5 is a sectional view of the same backup mold.

As shown in FIGS. 4A, 4B and 5, the backup mold 10 includes a backup main body 11 made of an aluminum alloy by casting to have a thickness of 10 mm to 30 mm and a case portion 17 having a box shape and covering the back surface side of the backup main body 11 with a space therebetween.

The front surface of the backup main body 11 has a recessed shape that is the same as the protruding shape of the back surface of the shell main body 3. Temperature control pipes 12 are provided in the backup main body 11 on the back surface side, and a temperature control fluid can flow through the temperature control pipes 12. For each temperature control pipe 12, for example, a flexible stainless steel (SUS) pipe is used.

A ventilation groove 13 connected in, for example, a square grid pattern, is recessed by machining on the front surface of the backup main body 11, leaving a receiving surface 14 for receiving the back surface of the shell main body 3. The ventilation groove 13 includes ventilation grooves extending parallel to the direction of the striped grooves 6 (FIG. 7B) and ventilation grooves extending in the direction intersecting the direction of the striped grooves 6 (FIG. 7C). For example, the ventilation groove 13 has a depth of 0.2 mm to 3 mm and a width of 1 mm to 7 mm, and the receiving surface 14 is a group of squares of 5 mm square to 20 mm square.

The backup main body 11 is formed with a plurality of ventilation holes 15 communicating with the space on the back surface side from the ventilation groove 13. The diameter of each ventilation hole 15 is, for example, 5 mm to 10 mm.

The case portion 17 is provided with a ventilation plug 18 for communicating the space with the outside of the mold such that a vacuum suction device (not shown) outside the mold can be connected to the ventilation plug 18.

Figure 6A:
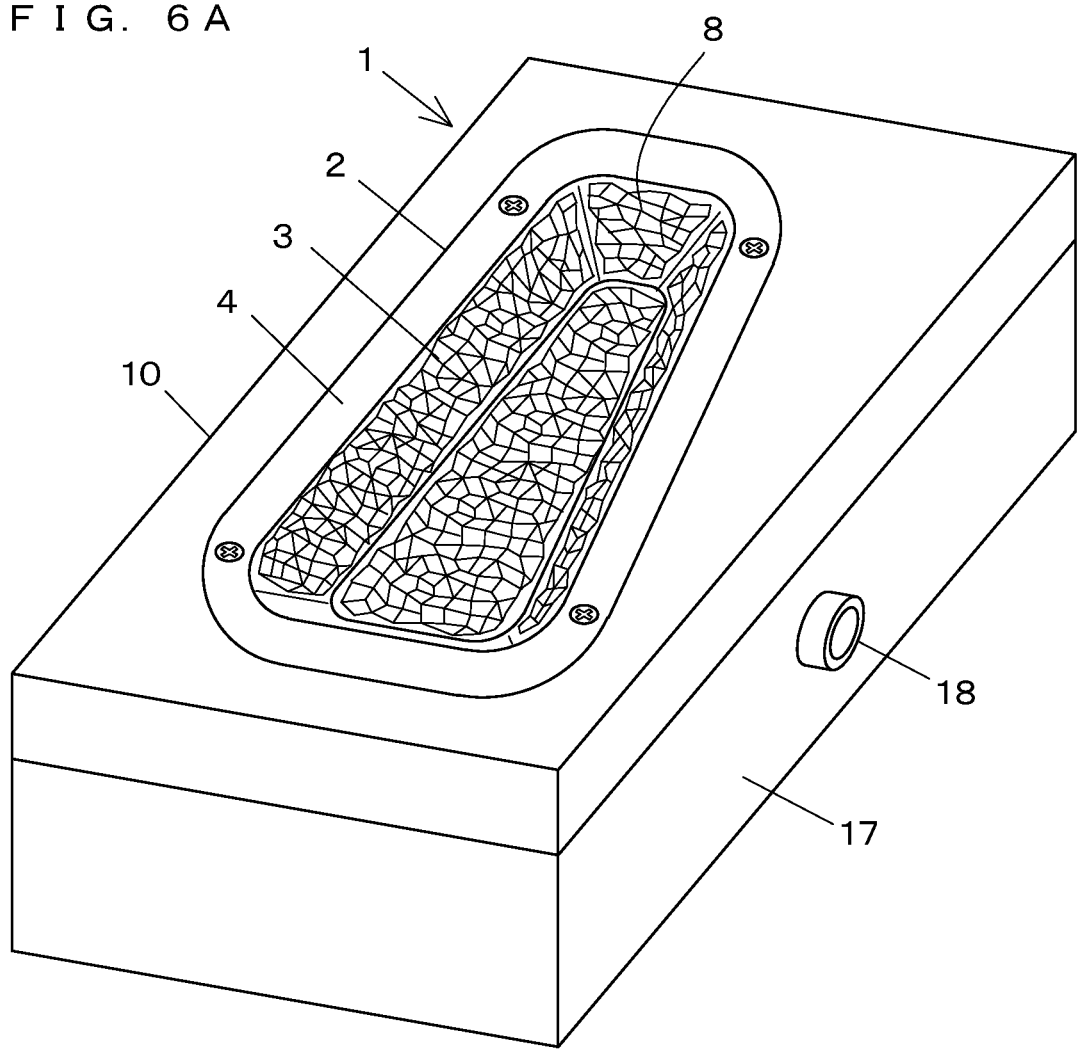
FIGS. 6A and 6B show the molding mold according to the first embodiment in which the shell mold is attached to the backup mold.
Figure 6B:
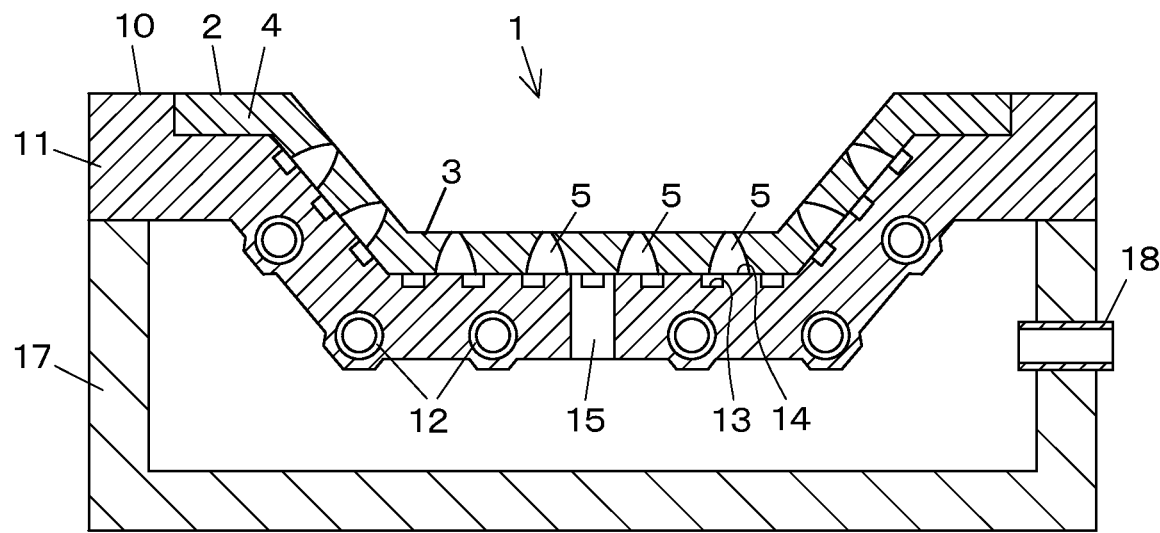

As shown in FIGS. 6A and 6B, the shell main body 3 is fitted to and abuts the backup main body 11, and the flange portion 4 is fitted to a counterbore portion of the backup main body 11 and is screwed by screws such that the shell mold 2 is replaceably attached to the backup mold 10. In this attached state, as shown in FIGS. 7B and 7C, all of the vacuum suction holes 5 communicate with the ventilation groove 13 via the striped grooves 6.

The molding mold 1 configured as described above is manufactured by the following method.

The back surface of the shell main body 3 and the front surface of the backup main body 11 need to have the same shape to be fitted to each other, and the fitting accuracy is ensured by cutting one or both of the back surface of the shell main body 3 and the front surface of the backup main body 11.

Figure 3C:
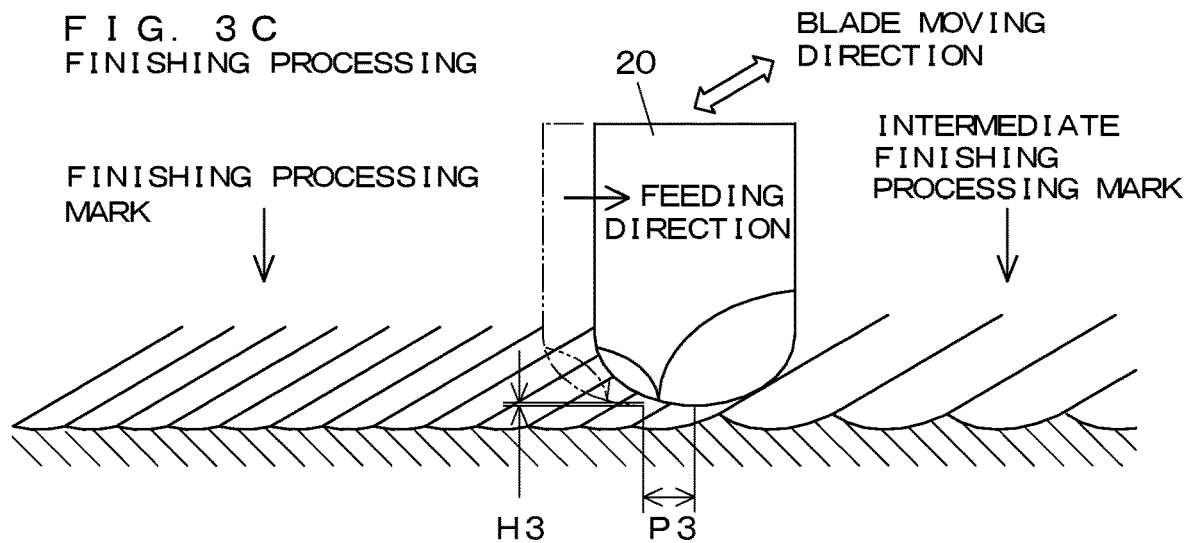

Therefore, usually, through three steps of rough processing shown in FIG. 3A, intermediate finishing processing shown in FIG. 3B, and finishing processing shown in FIG. 3C, the surface is finally brought closer to a smooth surface to enhance the fitting accuracy. Specifically, for example, a ball end mill with a blade diameter of 16 mm is used, a feed pitch P1 is set to more than 5.0 mm and a processing depth H1 is set to more than 0.4 mm in the rough processing, a feed pitch P2 is set to 0.5 mm to 5.0 mm and the processing depth H1 is set to 0.01 mm to 0.4 mm in the next intermediate finishing processing, and a feed pitch P3 is set to less than 0.5 mm and the processing depth H1 is set to less than 0.01 mm in the next finishing processing.

However, when both of the back surface of the shell main body 3 and the front surface of the backup main body 11 are brought close to a smooth surface by performing the finishing processing shown in FIG. 3C, some vacuum suction holes 5 are completely closed by the receiving surface 14 as shown in FIG. 7A as a comparative example (at the center in the drawing).

Therefore, in the present embodiment, the cutting is performed as follows.

The front surface of the backup main body 11 is brought close to a smooth surface by performing the finishing processing shown in FIG. 3C.

Processing of the back surface of the shell main body 3 is stopped after the rough processing shown in FIG. 3A and the intermediate finishing processing shown in FIG. 3B are performed, and the finishing processing in FIG. 3C is not performed to leave, as the cutting marks, the multiple striped grooves 6 with the feed pitch P2 of 0.5 mm to 5.0 mm and the processing depth H1 of 0.01 mm to 0.4 mm and the ridges 7 between the striped grooves 6. Even when the cutting marks are left, the required fitting accuracy is ensured.

With the above, as shown in FIGS. 7B and 7C, all of the vacuum suction holes 5 communicate with the ventilation groove 13 through the striped grooves 6, and there is no vacuum suction hole 5 completely closed by the receiving surface 14, whereby the suction efficiency in the vacuum molding can be enhanced. In particular, as shown in FIG. 7C, a large number of striped grooves 6 communicate with the ventilation groove 13 extending in the direction intersecting the direction of the striped grooves 6.

A resin sheet can be vacuum-molded by the following method using the molding mold 1 configured as described above.

As shown in FIG. 8, a thermoplastic resin sheet 21 softened by heating is applied to the molding mold 1 and pushed into the front surface of the shell main body 3 with a male mold 22. Subsequently, the space inside the backup mold 10 is depressurized by the vacuum suction device (not shown) described above, and the resin sheet 21 is vacuum-sucked to the front surface of the shell main body 3 by the vacuum suction holes 5 through the ventilation holes 15, the ventilation groove 13, and the striped grooves 6 to mold the resin sheet 21. At this time, due to the high suction efficiency described above, the uneven pattern 8 of the shell main body 3 is accurately transferred to the resin sheet 21, and a realistic uneven pattern is formed.

Second Embodiment

Figure 9:
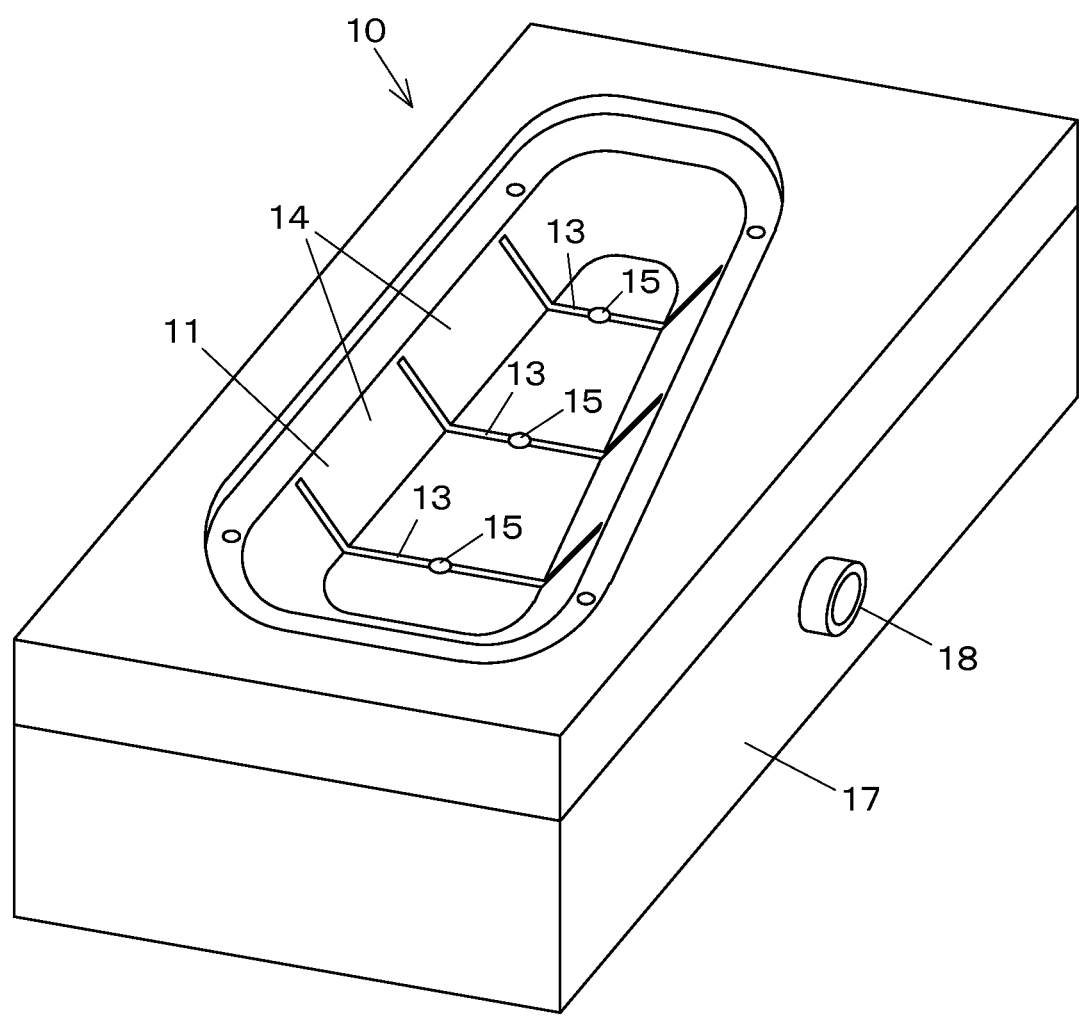
FIG. 9 is a perspective view showing the front surface side of the backup mold in the molding mold according to a second embodiment.

Next, the molding mold according to a second embodiment shown in FIG. 9 is different from the first embodiment only in that the ventilation groove 13 of the backup main body 11 is changed to three linear ventilation grooves 13 extending in the direction intersecting with the striped grooves 6 (see FIGS. 2A and 2B), and is common to the first embodiment in other respects. Each ventilation groove 13 communicates with each ventilation hole 15.

The ventilation grooves 13 also communicate with all of the vacuum suction holes 5 through the striped grooves 6 in the same manner as in FIG. 7C. Therefore, the same action and effect as in the first embodiment can also be obtained by the second embodiment.

The present invention is not limited to the above embodiments, and can be modified as appropriate without departing from the spirit and scope of the invention as described below, for example.

(1) The ventilation groove 13 and the receiving surface 14 may be formed on the back surface of the shell main body 3. In this case, it is preferable not to form the ventilation groove 13 and the receiving surface 14 on the front surface of the backup main body 11.

(2) The striped grooves 6 and the ridges 7 may be formed on the receiving surface 14 of the backup main body 11. In this case, it is preferable not to form the striped grooves 6 and the ridges 7 on the back surface of the shell main body 3.

REFERENCE SIGNS LIST

1 Molding mold
2 Shell mold
3 Shell main body
4 Flange portion
5 Vacuum suction hole
6 Striped groove
7 Ridge
8 Uneven pattern
10 Backup mold
11 Backup main body
12 Temperature control pipe
13 Ventilation groove
14 Receiving surface
15 Ventilation hole
17 Case portion
18 Ventilation plug
20 End mill
21 Resin sheet
22 Male mold

The invention claimed is:

1. A molding mold comprising: a shell mold provided with a plurality of vacuum suction holes; and a backup mold for backing up the shell mold, a back surface of the shell mold and a front surface of the backup mold having the same shape and being fitted to each other, wherein:
a ventilation groove is formed on the front surface of the backup mold or the back surface of the shell mold, leaving a receiving surface for receiving a mating surface;
a plurality of striped grooves and ridges between the striped grooves are formed on the back surface of the shell mold or the front surface of the backup mold, the striped grooves having a feed pitch of 0.5 mm to 5.0 mm and a processing depth of 0.01 mm to 0.4 mm; and the vacuum suction holes and the ventilation groove communicate with each other through the striped grooves.

2. The molding mold according to claim 1, wherein the ventilation groove is formed only on the front surface of the backup mold.

3. The molding mold according to claim 1, wherein the ventilation groove includes a ventilation groove extending in a direction intersecting a direction of the striped grooves.

4. The molding mold according to claim 1, wherein the striped grooves and the ridges are formed only on the back surface of the shell mold.

5. The molding mold according to claim 2, wherein the striped grooves and the ridges are formed only on the back surface of the shell mold.

6. The molding mold according to claim 3, wherein the striped grooves and the ridges are formed only on the back surface of the shell mold.

7. A manufacturing method of a molding mold including a shell mold provided with a plurality of vacuum suction holes and a backup mold for backing up the shell mold, a back surface of the shell mold and a front surface of the backup mold having the same shape and being fitted to each other, the manufacturing method comprising:
 processing a ventilation groove on the front surface of the backup mold or the back surface of the shell mold, leaving a receiving surface for receiving a mating surface; and
 cutting the back surface of the shell mold or the front surface of the backup mold with an end mill provided with a non-flat tip to leave a plurality of striped grooves and ridges between the striped grooves as cutting marks, the striped grooves having a feed pitch of 0.5 mm to 5.0 mm and a processing depth of 0.01 mm to 0.4 mm.

8. The manufacturing method according to claim 7, wherein the end mill is a ball end mill or a radius end mill.

9. The manufacturing method according to claim 7, wherein a blade diameter of the end mill is 15 mm to 20 mm.

10. The manufacturing method according to claim 8, wherein a blade diameter of the end mill is 15 mm to 20 mm.

* * * * *